(12) United States Patent
Liu et al.

(10) Patent No.: US 9,660,470 B2
(45) Date of Patent: May 23, 2017

(54) FLEXIBLE, HYBRID ENERGY GENERATING AND STORAGE POWER CELL

(71) Applicant: Nokia Corporation, Espoo (FI)

(72) Inventors: Yinglin Liu, Cambridge (GB); Zoran Radivojevic, Cambridge (GB); Piers Andrew, Cambridge (GB); Darryl Cotton, Cambs (GB)

(73) Assignee: Nokia Technologies Oy, Espoo (FI)

( * ) Notice: Subject to any disclaimer, the term of this patent is extended or adjusted under 35 U.S.C. 154(b) by 253 days.

(21) Appl. No.: 14/479,716

(22) Filed: Sep. 8, 2014

(65) Prior Publication Data

US 2016/0072332 A1 Mar. 10, 2016

(51) Int. Cl.
*H02J 7/00* (2006.01)
*H01M 10/46* (2006.01)
(Continued)

(52) U.S. Cl.
CPC ............ *H02J 7/0068* (2013.01); *H01G 11/04* (2013.01); *H01G 11/08* (2013.01); *H01G 11/52* (2013.01); *H01G 11/68* (2013.01); *H01M 10/46* (2013.01); *H02J 7/34* (2013.01); *H01G 11/32* (2013.01); *H01G 11/58* (2013.01); *H01G 11/62* (2013.01); *H01M 10/052* (2013.01); *H01M 10/0565* (2013.01); *H01M 10/0568* (2013.01); *H01M 10/44* (2013.01); *H01M 2300/0005* (2013.01);
(Continued)

(58) Field of Classification Search
CPC ..................................... H02J 7/0068

USPC ......................................................... 320/128
See application file for complete search history.

(56) References Cited

U.S. PATENT DOCUMENTS 6,346,346 B1    2/2002   Naskali ......................... 429/127
6,924,164 B2 *  8/2005   Jenson ................. A61N 1/3787
                                                          29/623.1
(Continued)

FOREIGN PATENT DOCUMENTS

WO    WO-2013/040137 A1    3/2013
WO    WO-2014/021970 A2    2/2014
WO    WO-2014/053886 A1    4/2014

OTHER PUBLICATIONS

Zyga, Lisa, "Self-charging battery both generates and stores energy", http://phys.org/news/2012-08-self-charging-battery-energy.html; Aug. 17, 2012, 16 pgs.

*Primary Examiner* — Yalkew Fantu
(74) *Attorney, Agent, or Firm* — Harrington & Smith

(57) ABSTRACT

An apparatus includes a separator/electrolyte assembly; a first energy storage portion disposed on a first surface of the separator/electrolyte assembly; a second energy storage portion disposed on a second surface of the separator/electrolyte assembly; a first metallized piezoelectric film disposed on the first energy storage portion; and a second metallized piezoelectric film disposed on the second energy storage portion. When a force is applied to the first metallized piezoelectric film, a piezoelectric effect converts mechanical strain into electric potential and each energy storage portion stores the energy converted in the first energy storage portion and the second energy storage portion for subsequent discharge from the first energy portion and the second energy storage portion to an electronic device.

19 Claims, 10 Drawing Sheets

(51) Int. Cl.
  *H02J 7/34*     (2006.01)
  *H01G 11/52*    (2013.01)
  *H01G 11/68*    (2013.01)
  *H01G 11/04*    (2013.01)
  *H01G 11/08*    (2013.01)
  *H01M 10/0565*      (2010.01)
  *H01M 10/44*        (2006.01)
  *H01G 11/58*        (2013.01)
  *H01G 11/62*        (2013.01)
  *H01G 11/32*        (2013.01)
  *H01M 10/052*       (2010.01)
  *H01M 10/0568*      (2010.01)

(52) U.S. Cl.
  CPC ...... *H01M 2300/0017* (2013.01); *H02J 7/345* (2013.01); *Y02E 60/13* (2013.01)

(56) References Cited

U.S. PATENT DOCUMENTS

| | | | |
|---|---|---|---|
| 7,494,945 B2 | 2/2009 | Moreshead | 442/185 |
| 8,431,264 B2 | 4/2013 | Neudecker et al. | 429/137 |
| 2008/0212262 A1 | 9/2008 | Micallef | |
| 2009/0058223 A1 | 3/2009 | Micallef | |
| 2010/0045241 A1 | 2/2010 | Nousiainen | 320/137 |
| 2010/0067172 A1 | 3/2010 | Zhang et al. | 361/323 |
| 2010/0160994 A1 | 6/2010 | Feldman et al. | 607/33 |
| 2010/0298729 A1 | 11/2010 | Zhang et al. | 600/485 |
| 2011/0085284 A1 | 4/2011 | Micallef | |
| 2011/0140579 A1 | 6/2011 | Moon et al. | |
| 2011/0199148 A1 | 8/2011 | Iwamura | |
| 2011/0235241 A1* | 9/2011 | Park | H01G 9/02 361/502 |
| 2012/0156528 A1* | 6/2012 | Cooley | H01M 16/00 429/9 |
| 2012/0313591 A1* | 12/2012 | Brambilla | C01B 31/0233 320/166 |
| 2013/0265003 A1 | 10/2013 | Wei et al. | |
| 2014/0042988 A1* | 2/2014 | Kuttipillai | H01G 11/30 320/167 |
| 2014/0057147 A1* | 2/2014 | Andrew | H01M 10/0431 429/94 |
| 2014/0184165 A1* | 7/2014 | Takahashi | H01M 10/486 320/134 |
| 2014/0239905 A1* | 8/2014 | Yamazaki | H01M 10/44 320/128 |

* cited by examiner

FLEXIBLE, HYBRID ENERGY GENERATING AND STORAGE POWER CELL

BACKGROUND

Technical Field

The exemplary and non-limiting embodiments disclosed herein relate generally to electronic devices and methods and, more particularly, to electronic hybrid power devices that generate and store energy. Certain embodiments and various aspects thereof relate to portable electronic devices in which renewable and sustainable sources of energy are employed.

BRIEF DESCRIPTION OF PRIOR DEVELOPMENTS

Energy harvesting is a process by which energy is derived from external sources (e.g., solar power or kinetic energy), captured, and stored for subsequent use in various devices. The devices in which the stored energy may be used generally include small, autonomous devices such as wearable electronics and sensor networks. The devices may be wired or wireless.

SUMMARY

The following summary is merely intended to be exemplary. The summary is not intended to limit the scope of the claims.

In accordance with one aspect, an apparatus comprises a separator/electrolyte assembly; a first energy storage portion disposed on a first surface of the separator/electrolyte assembly; a second energy storage portion disposed on a second surface of the separator/electrolyte assembly; a first metallized piezoelectric film disposed on the first energy storage portion; and a second metallized piezoelectric film disposed on the second energy storage portion. When a force is applied to the first metallized piezoelectric film, a piezoelectric effect converts mechanical strain into electric potential and each energy storage portion stores the energy converted in the first energy storage portion and the second energy storage portion for subsequent discharge from the first energy portion and the second energy storage portion to an electronic device.

In accordance with another aspect, a method comprises generating a voltage in an apparatus, the apparatus comprising a separator/electrolyte assembly, a first energy storage portion disposed on a first surface of the separator/electrolyte assembly, a second energy storage portion disposed on a second surface of the separator/electrolyte assembly, a first metallized piezoelectric film disposed on the first energy storage portion, and a second metallized piezoelectric film disposed on the second energy storage portion. When a force is applied to the first metallized piezoelectric film, a piezoelectric effect converts mechanical strain into electric potential and each energy storage portion stores the energy converted in the first energy storage portion and the second energy storage portion and discharges the stored energy from the first energy portion and the second energy storage portion to an electronic device.

In accordance with another aspect, an apparatus for operating a hybrid power device comprises means for generating a voltage in the hybrid power device; means for storing the energy generated in the hybrid power device; and means for discharging the stored energy from the means for storing the energy to an electronic device. The means for operating a hybrid power device may comprise means for controlling the discharging of the stored energy.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Kinetic energy harvesting is an environmental friendly way of capturing energy from movement such as human motion, low-frequency seismic vibrations, or movement of a membrane due to acoustic noise, or from movement derived from ambient environmental sources such as heat, light, or water flow. The captured energy may then be stored for subsequent use, for example, in rechargeable batteries. Normally, the energy used to charge rechargeable batteries comes from a battery charger using AC electricity. However, for some applications battery recharging may be difficult or not possible. Even without storage of the captured energy, energy harvesting may be useful as a means for providing energy in emergency situations, e.g., as an alternate to conventional backup power.

Various exemplary embodiments as disclosed herein are directed to portable and wearable electronic devices that operate based on renewable and sustainable energy harvested from ambient environmental sources. Such portable and wearable electronic devices include, but are not limited to, hand-held mobile devices and/or wearable devices such as phones, cameras, tablets, video/audio devices, navigation devices, gaming devices, messaging devices, web-browsers, combinations of the foregoing, and the like. An impediment to the use of such devices has been the size and weight of batteries utilized to store the harvested energy.

Figure 1:
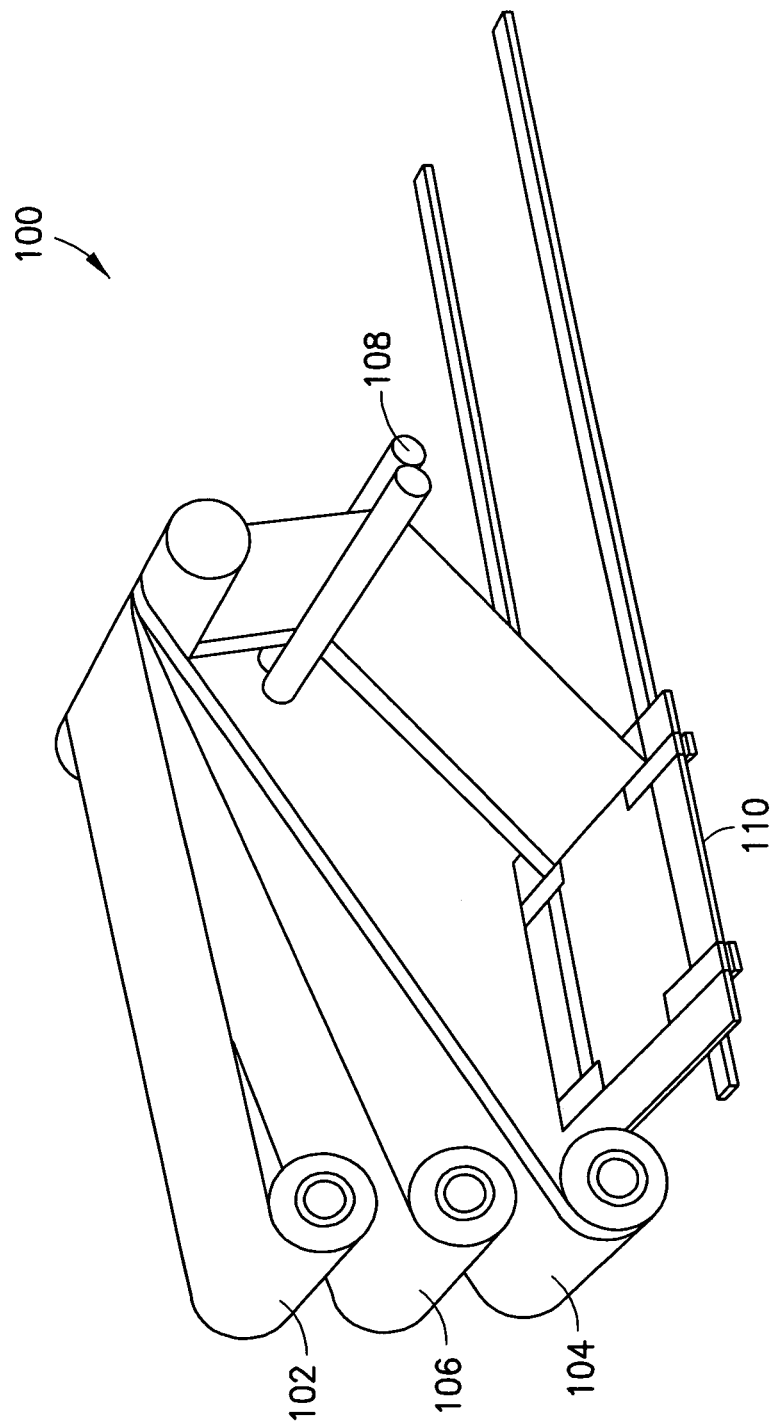
FIG. 1 is a perspective view of an assembly of a lithium ion battery structure of the prior art.

Referring to FIG. 1, an assembly of a lithium ion battery structure of the prior art is shown generally at 100 and is hereinafter referred to as "battery 100." In the battery 100, an anode layer 102 and a cathode layer 104 are disposed on opposing sides of a separator layer 106. Both the anode layer 102 and the cathode layer 104 consist of an active electrode material and a supporting current collector in the form of a thin and flexible metal foil. In the battery 100, the anode layer 102 is a carbon film coated on a copper foil, and the cathode layer 104 is a lithium metal oxide film coated on an aluminum foil. Materials for the anode layer 102, the cathode layer 104, and the separator layer 106 are fed from spools of the respective materials and assembled using pinch rollers 108 to form the battery 100 as a unitary layer 110.

Figure 2:
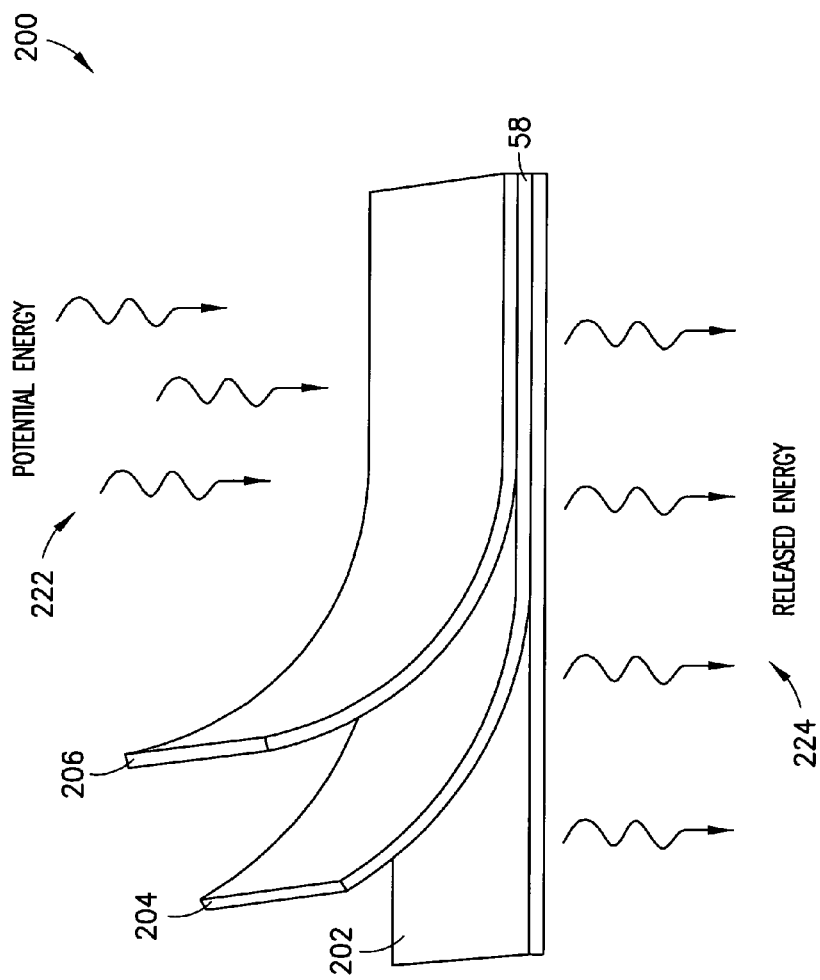
FIG. 2 is a schematic view of an assembly of a flexible fabric of the prior art.

Referring to FIG. 2, an assembly of a flexible fabric of the prior art is shown generally at 200 and is hereinafter referred to as "fabric 200." Fabric 200 is an integrated thin film fabric stack comprising an energy release layer 202 on which is disposed a rechargeable energy storage layer 204. An optional charge/recharge layer 206 may be disposed on the rechargeable energy storage layer 204. The rechargeable energy storage layer 204 (or the rechargeable energy storage layer 204 in combination with the optional charge/recharge layer 206) is capable of receiving surrounding potential energy 222 from external sources and converting the received energy to electrical energy, storing the electrical energy integral to the fabric 200, and releasing the electrical energy in different ways as energy 224.

Referring to FIGS. 3A through 6, the exemplary embodiments of the present invention are directed to hybrid power devices that may be used for generating and storing energy. These hybrid power devices are electrochemical cells (e.g., batteries or supercapacitors), which include two current collectors and electrodes separated by a separator infused with electrolyte. One embodiment of such a device provides a self-charging battery or a supercapacitor by integrating an energy harvesting layer in the current collector. The energy harvesting layer may be an inseparable internal component of the battery or the supercapacitor and as such embodies a monolithic device which has the hybrid functions of both energy harvesting and energy storage.

In using the energy harvesting layer to harvest energy from movement, a piezoelectric effect can be relied on. The piezoelectric effect employs a material in which mechanical strain is converted into an electric field, which in turn is used to create an electric current or voltage, thus providing for both charging and storage capability in one structure. Most piezoelectric electricity sources produce power on the order of milliwatts, which may be generally insufficient for most system applications, but may be enough for some classes of wireless autonomous devices and self-powered mechanical sensors.

In the exemplary embodiments of the hybrid power devices disclosed herein, one or both of the current collectors are composed of thin and flexible metallized polyvinylidene fluoride (PVDF) film, which has the ability to use mechanical strain energy to separate electrical charge and the charge thus generated is then stored in the energy storage unit. The metallized PVDF film has two functions, converting mechanical strain into electric energy (PVDF layer) and acting as a current collector (metal layer). When the device is mechanically compressed or bent or otherwise flexed, the PVDF film on the current collector experiences a straining force and thereby generates a piezoelectric potential that serves as a charge pump to charge the electrochemical cell. By using metallized PVDF as the current collector rather than using PVDF as a separator in an electrochemical cell (as described in the prior art), two PVDF layers may be integrated in the structure, which may double the charging efficiency. Traditional battery and supercapacitor electrodes and processing methods may be used, which generally simplifies manufacturing processes, promotes practical application, and leads to overall cost effectiveness.

In manufacturing the hybrid power devices as shown in FIGS. 3A through 6B, the manufacturing procedure is similar to that of a traditional battery or supercapacitor manufacturing except that the metal foil current collector is changed to a metallized piezoelectric film. There is no extra step of connecting the battery to a piezoelectric layer and then laminating the battery and the piezoelectric layer together as there is with the fabric 200 as shown in FIG. 2. The two outer metal electrodes on the top and bottom electrode layers may be connected with a diode 309. This may be done after roll-to-roll lamination. This may simplify the fabrication and lower the manufacturing cost. Since the piezoelectric layer may be deposited directly onto the current collector of the battery or supercapacitor, the harvested energy may be directly electrochemically stored with minimum resistive loss, so it may be more efficient than the two separated sections connected together via a potentially lossy conductor.

Figure 3A:
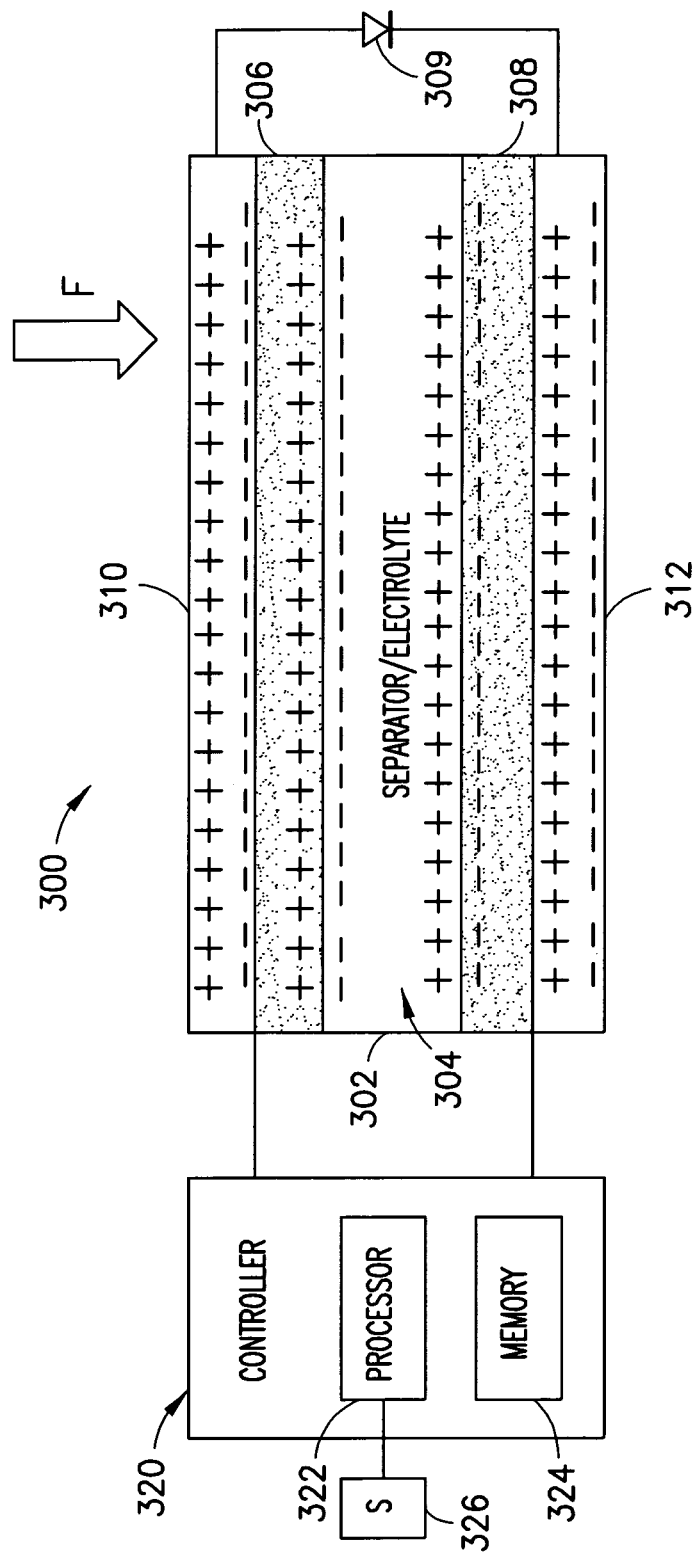
FIG. 3A is schematic representation of a hybrid power device in the form of a supercapacitor.

Referring to FIG. 3A, a working mechanism of a hybrid power device in the form of a hybrid supercapacitor is designated generally by the reference number 300 and is hereinafter referred to as "supercapacitor 300." The exemplary embodiments as described herein are not limited to being a supercapacitor, however, as the working mechanism of the hybrid power device may comprise a battery. The supercapacitor 300 comprises a separator 302 infused with an electrolyte to define a separator/electrolyte assembly 304. A first electrode defined by a first carbon layer 306 is disposed on one side of the separator/electrolyte assembly 304, and a second electrode defined by a second carbon layer 308 is disposed on another (e.g., opposing) side of the separator/electrolyte assembly 304. Materials from which the separator may be fabricated include suitable polymers, for example, polypropylene, polyethylene, polytetrafluoroethylene (PTFE), as well as any other suitable polymer. A first metallized PVDF film 310 is disposed on the first carbon layer 306, and a second metallized PVDF film 312 is disposed on the second carbon layer 308. Materials utilized for the metallization of the PDVF film may include aluminum. Other materials for metallization include, but are not limited to, copper, chromium, gold, nickel, silver, platinum, rhodium, alloys of any of the foregoing, and the like. The electrolyte may be aqueous with acids such as sulfuric acid ($H_2SO_4$), alkalis such as potassium hydroxide (KOH), or salts such as quaternary phosphonium salts, sodium perchlorate ($NaClO_4$), lithium perchlorate ($LiClO_4$), or lithium hexafluoride arsenate ($LiAsF_6$), or may be an organic electrolyte such as acetonitrile, propylene carbonate, tetrahydrofuran, diethyl carbonate, γ-butyrolactone, and solutions with quaternary ammonium salts or alkyl ammonium salts such as tetraethylammonium tetrafluoroborate ($N(Et)_4BF_4$) or triethyl (methyl) tetrafluoroborate ($NMe(Et)_3BF_4$), or gel electrolyte. The diode 309 may be connected to the two outer metal electrodes outer electrodes on the piezoelectric films to enable the pumping of charge in a single direction under multiple deformation/release cycles. The diode 309 may be of a thin-film type integrated into the structure, or it may be an external module connected to the structure, connected across the outermost surfaces of the metallized surfaces of the first metallized PVDF film 310 and the second metallized PVDF film 312.

When a force F is applied to the first metallized PVDF film 310, a piezoelectric field is generated. If the generated field is higher than the threshold voltage of the diode 309, the diode 309 conducts. The generated field across both of the piezoelectric layers causes charge separation at each electrolyte-carbon electrode liquid-solid interface, which effectively creates two double layer capacitors that are series-connected by the electrolyte. After the pressure is released, the diode 309 turns off, the voltage between the two electrodes remains present, and the energy is stored in the electrode/electrolyte assembly 304/306. Repeated application of pressure exerts repeated forces F on the first metallized PVDF film 310, which causes a trickle charge to be continually fed to the supercapacitor 300 to keep the charge topped up. The metallized PVDF films 310, 312 parallel with the connected diode 309, operate like a DC power supply for a conventional supercapacitor.

The operation of the supercapacitor 300 may be controlled by a controller 320 coupled to one or more portions of the supercapacitor 300. In particular, the supercapacitor 300 may be coupled to a controller 320 having a processor 322 and a memory 324, the processor 322 including software 326, with the controller 320 being coupled to the innermost metallized surfaces of the first metallized PVDF film 310 and the second metallized PVDF film 312. Control of the supercapacitor 300 may comprise regulating the amount of energy generated or regulating the amount of energy discharged based on various parameters.

Figure 3B:
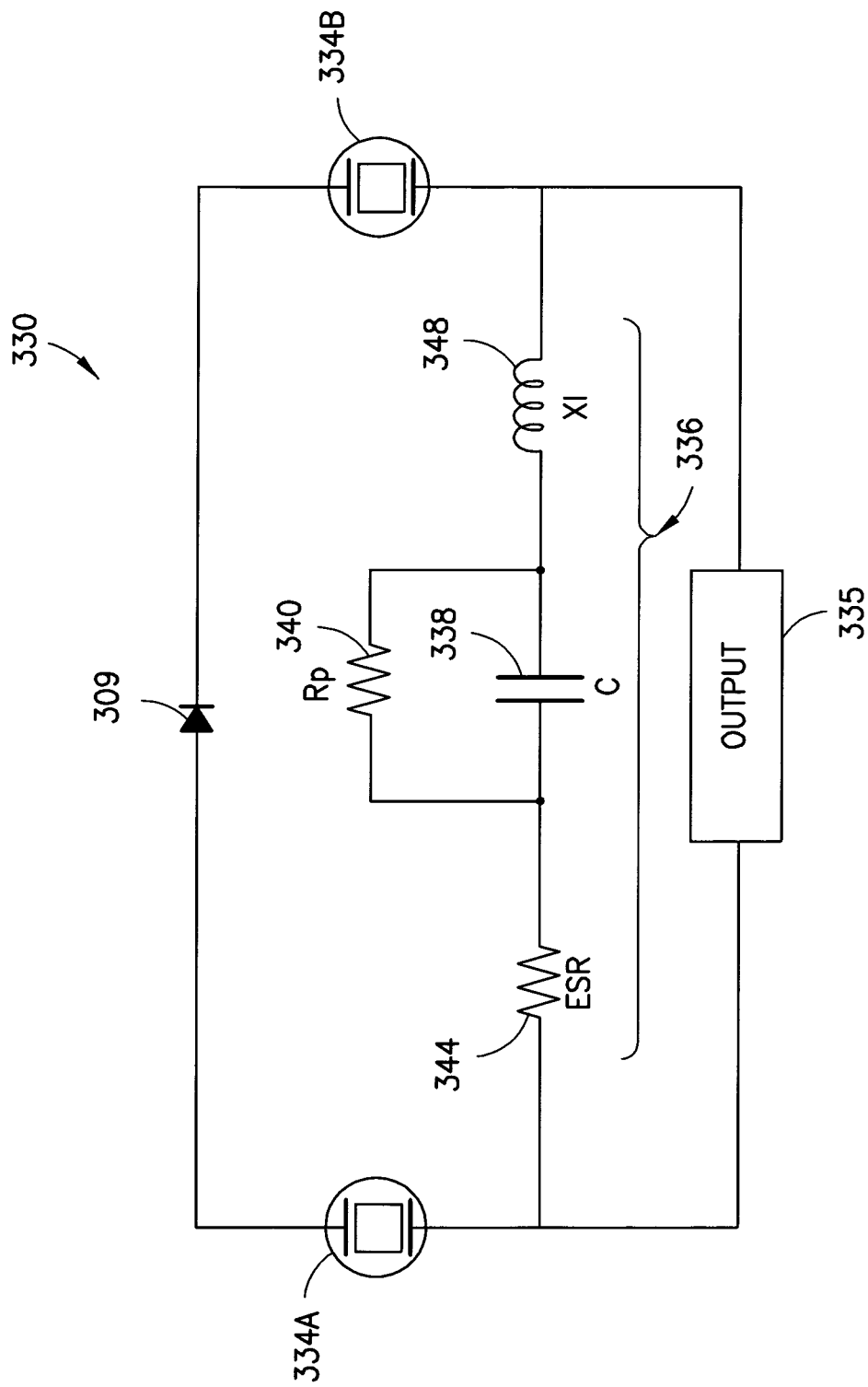
FIG. 3B is a schematic representation of an equivalent charging circuit of the supercapacitor of FIG. 3A.

Referring to FIG. 3B, an equivalent charging circuit of the supercapacitor of FIG. 3A is shown generally at 330 and is hereinafter referred to as "equivalent circuit 330." Equivalent circuit 330 may be defined by a first piezoelectric element 334A connected in series with the diode 309 and a second piezoelectric element 334B, an output 335 connected across the first piezoelectric element 334A and the second piezoelectric element 334B, and capacitor/inductor 336 connected in parallel across the output 335. The capacitor/inductor 336 comprises a capacitor 338 and a limiting resistor 340 in parallel and serially connected with an equivalent series resistor 344 and a coil 348.

Figure 4A:
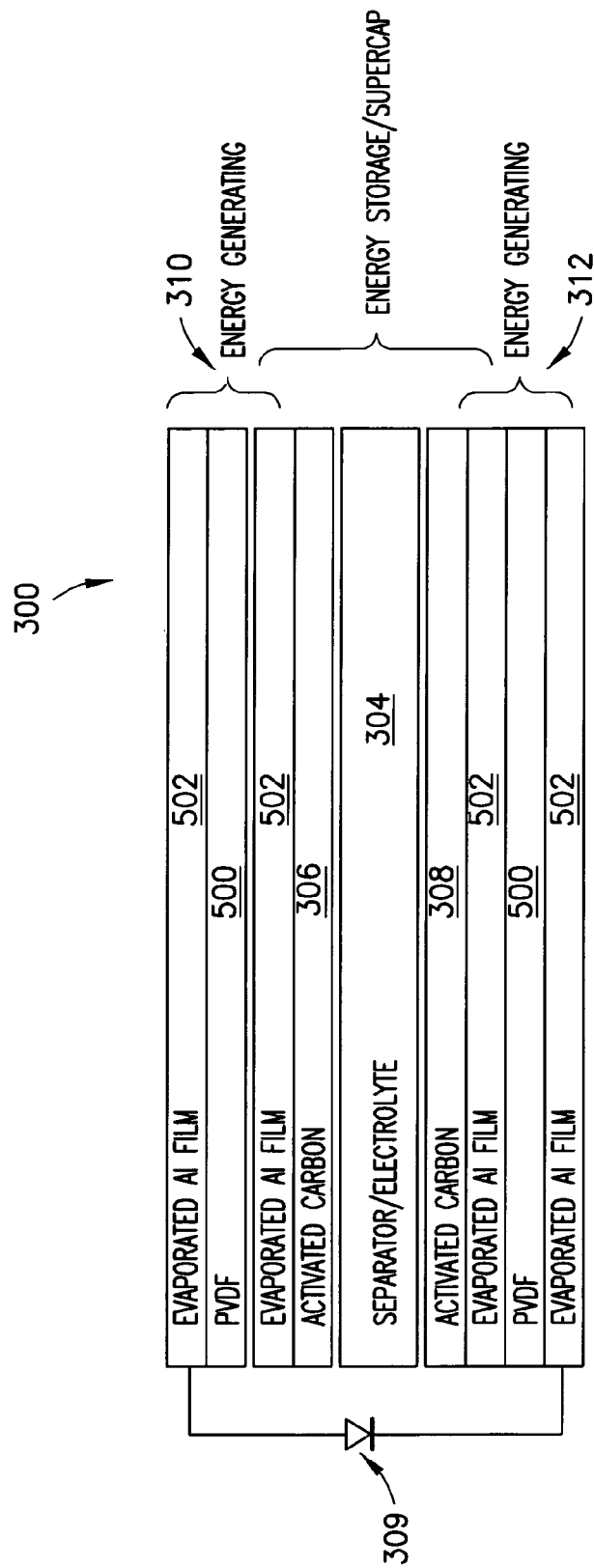
FIG. 4A is a schematic representation of a flexible hybrid electrochemical cell embodied as a supercapacitor.
Figure 4B:
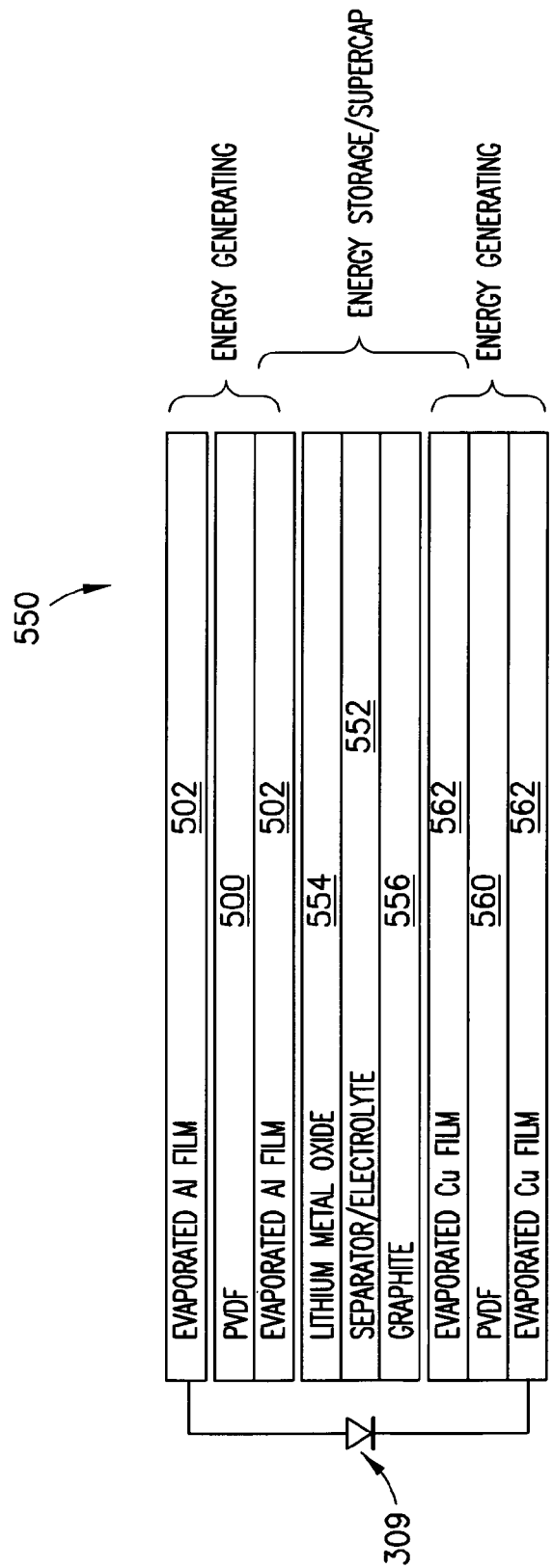
FIG. 4B is a schematic representation of a hybrid power device embodied as a hybrid lithium battery.

Referring now to FIGS. 4A and 4B, the structure and manufacturing of hybrid power devices is shown. In FIG. 4A, the structure of one exemplary embodiment of a flexible hybrid electrochemical' cell embodied as the supercapacitor 300 comprises the separator/electrolyte assembly 304 and a first activated carbon layer 306 and a second activated carbon layer 308 on the separator/electrolyte assembly 304, each activated carbon layer operating as an electrode. A first metallized PVDF film 310 and a second metallized PVDF film 312, each of which are formed by a metallized PVDF film formed by a layer 500 of PVDF sandwiched by layers 502 of evaporated aluminum, are disposed on the first and second carbon layers, respectively. The first carbon layer 306 and the second carbon layer 308 store energy while the first metallized PVDF film 310 and the second metallized PVDF film 312 each operate as energy generating assemblies.

Still referring to FIG. 4A, in one exemplary embodiment of fabricating the supercapacitor 300, activated carbon ink is bar-coated onto the metallized PVDF films to form the electrodes. The printed electrodes are then dried at 100 degrees centigrade for about one hour. A polypropylene separator soaked in or infused with electrolyte is sandwiched between the two electrodes. In the exemplary embodiments as disclosed herein, 1 molar TEABF$_4$ in water is used as the electrolyte. As a control during testing of the supercapacitor 300, a supercapacitor with aluminum foils as the current collectors (a structure without an energy generating portion) and a cell with two metallized PVDF films separated by an electrolyte infused separator (a structure without energy storage part) was also fabricated and compared to the supercapacitor 300. The diode 309 may be internally (thin film diode) or externally (such as traditional semiconductor diode) connected between the current collectors.

In FIG. 4B, one exemplary embodiment of the hybrid power device is embodied as a hybrid lithium battery 550, which comprises a separator/electrolyte assembly 552, a lithium metal oxide film 554 on one side thereof, and a graphite layer 556 disposed on an opposing side thereof, thereby defining an energy storage portion. A PVDF film 500 sandwiched between layers 502 of evaporated aluminum is disposed on the lithium metal oxide film 554, and a PVDF film 560 sandwiched between layers 562 of evaporated copper is disposed on the graphite layer 556.

Figure 5A:
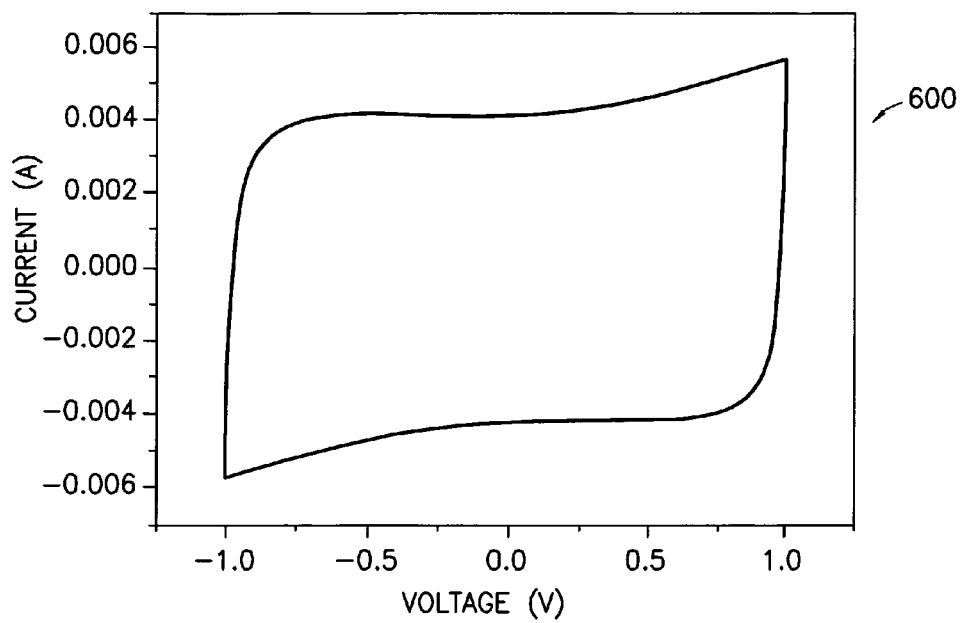
FIG. 5A is a cyclic voltammogram of capacitive behavior of a prototype hybrid supercapacitor.
Figure 5B:
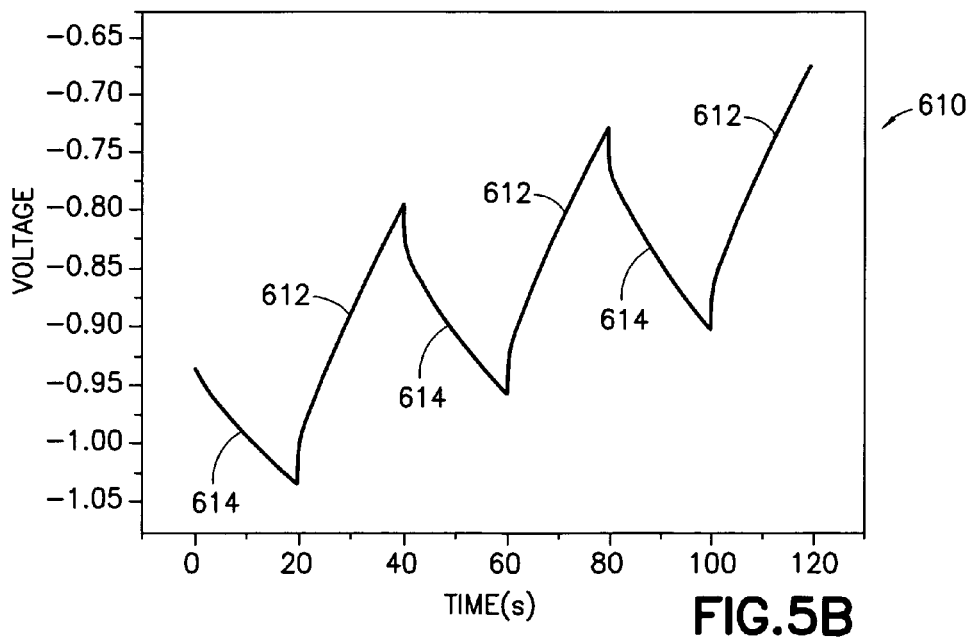
FIG. 5B is a graphical representation of charge and discharge curves of a prototype hybrid supercapacitor.

Referring now to FIGS. 5A and 5B, the supercapacitor 300 with and without PVDF films shows similar capacitive behavior tested by electrochemical measurement. In particular, a cyclic voltammogram, which is shown generally at 600 in FIG. 5A, illustrates the characteristics of current as a function of voltage. In FIG. 5B, a graph 610 shows charge curves 612 and discharge curves 614 to illustrate that the hybrid device operates as a supercapacitor.

The carbon-based supercapacitor 300 stores energy physically, with no chemical or phase changes compared to a lithium battery. The charging/discharge process may be repeated over and over again, theoretically with no limit and at high speed. This may make the supercapacitor 300 an ideal choice for use as the hybrid energy storage device as compared to a lithium battery.

Figure 6A:
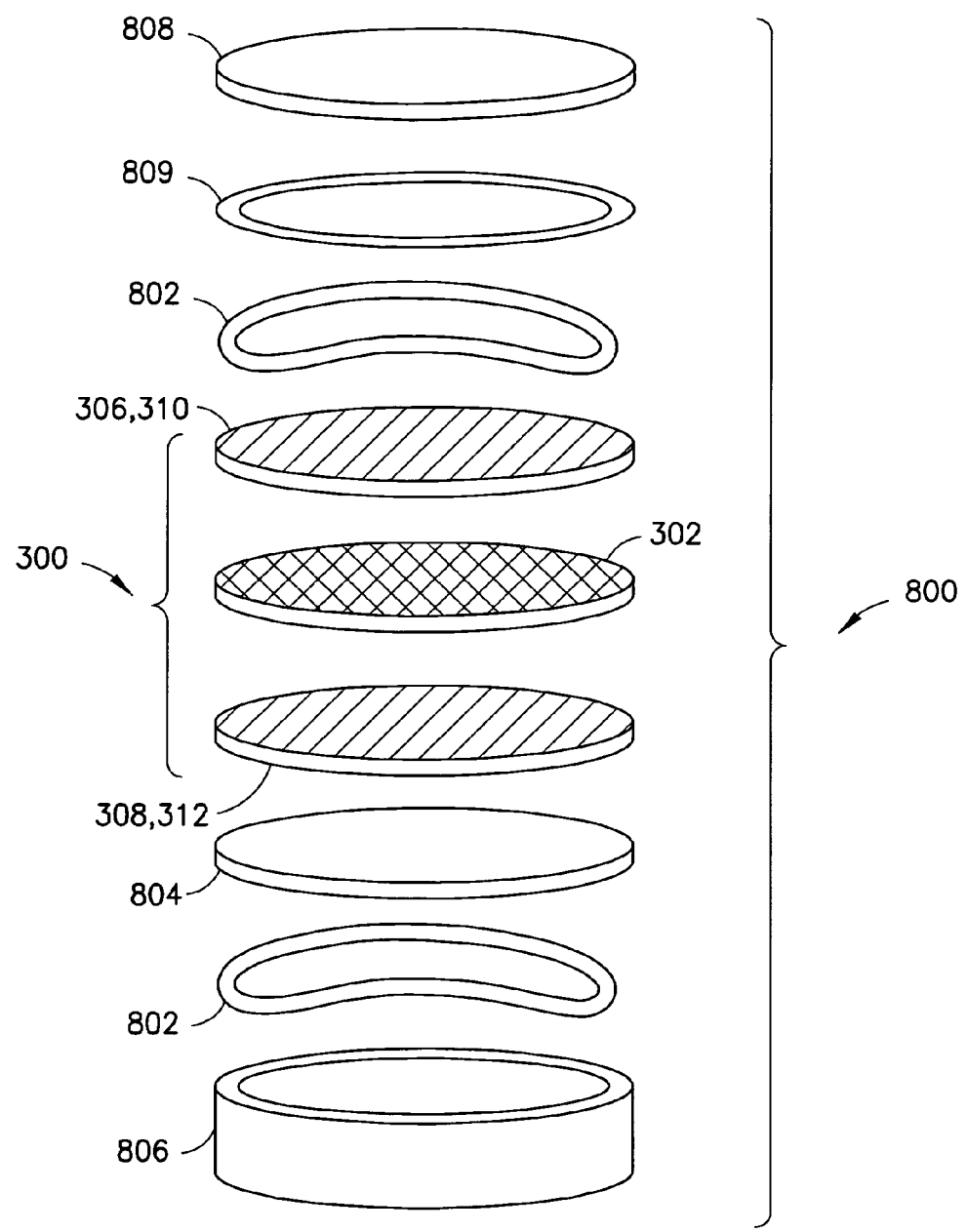
FIG. 6A is an exploded perspective view of the components of a hybrid supercapacitor assembled as a stainless steel coin-type cell.
Figure 6B:
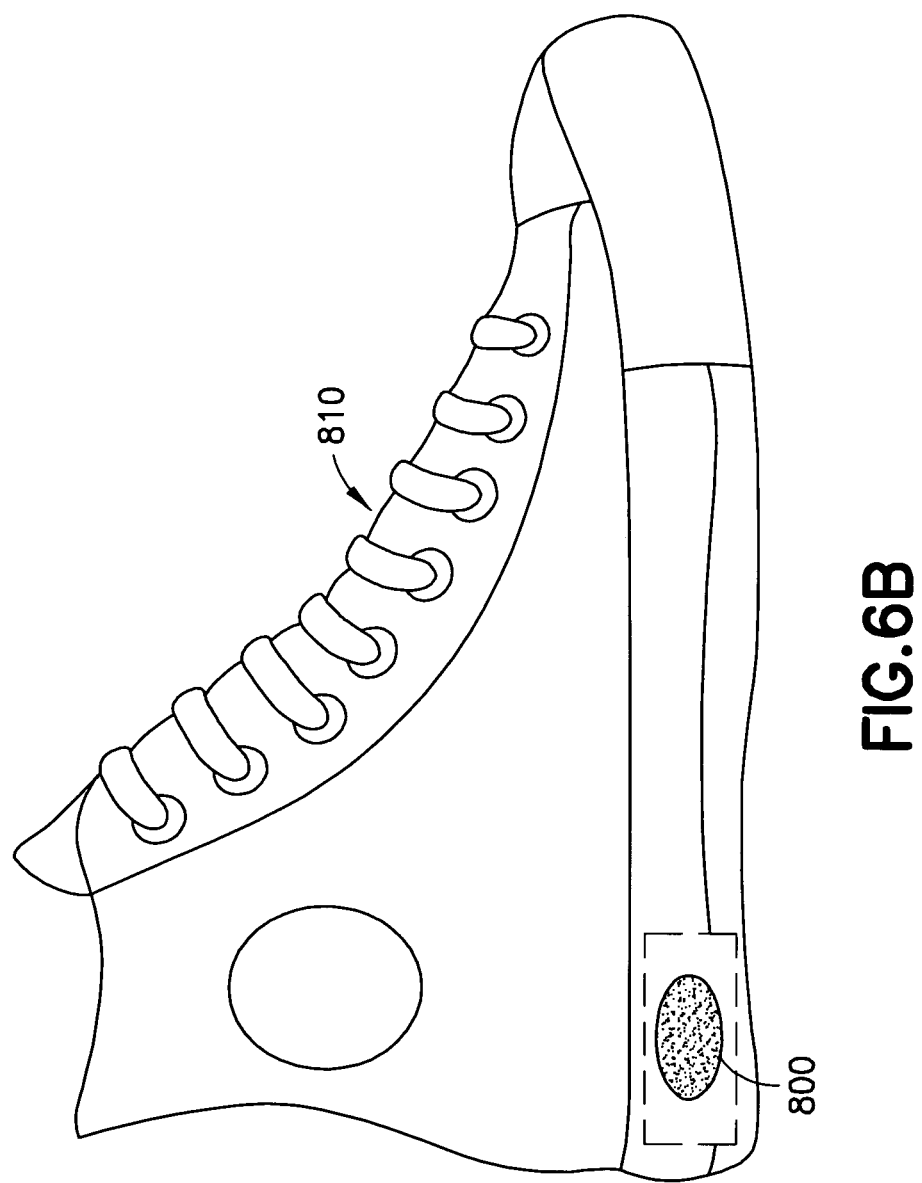
FIG. 6B is a schematic representation of a steel coin-type cell mounted in a user's shoe.

Referring now to FIG. 6A, the self-charging electrochemical cells (e.g., the supercapacitor 300) may be assembled as stainless steel coin-type cells 800. Each cell 800 comprises, for example, the supercapacitor 300 (separator 302 and electrodes 306, 308 on which metallized PVDF films 310, 312 are disposed and in which the diode 309 is incorporated), the supercapacitor 300 being sandwiched by wave springs 802 and at least one spacer 804 and contained in a can 806 closable by a lid 808 and gasket 809. As shown in FIG. 6B, one or more stainless steel coin-type cells 800 may be mounted in a user's shoe 810 (e.g., in the heel) to collect energy while the user is walking, jogging, or running. The stainless steel coin-type cells 800 may operate as a spare or backup power source.

Figure 7:
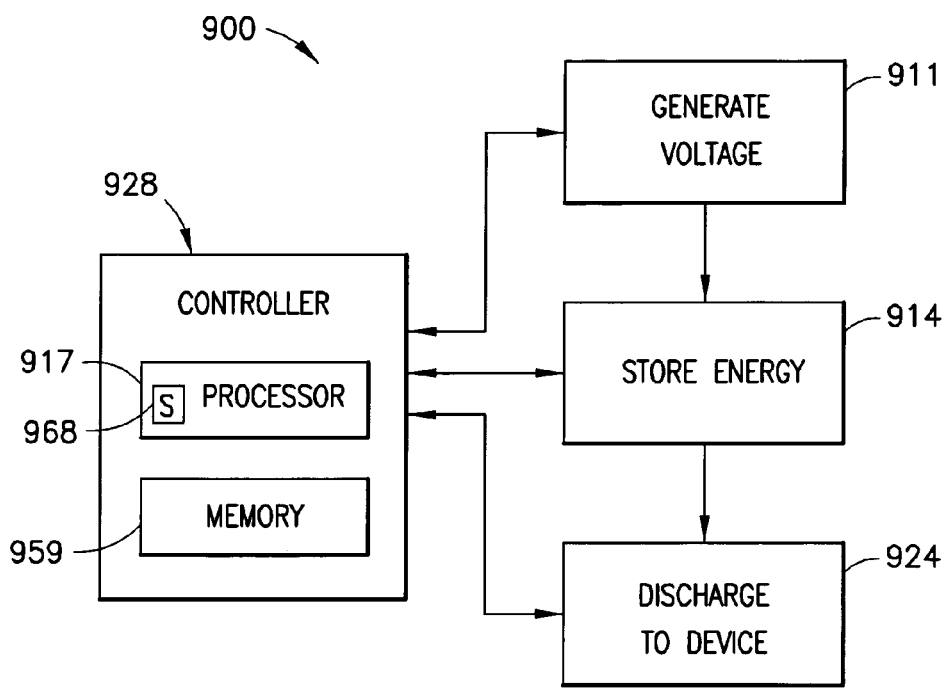
FIG. 7 is a flow representation of a method of harvesting and storing energy for subsequent use by an electronic device.

Referring now to FIG. 7, a method of harvesting and storing energy for subsequent use by an electronic device is designated generally by the reference number 900 and is hereinafter referred to as "method 900." In method 900, a voltage is generated in a generation step 911 using the supercapacitor 300. The generated voltage is stored as energy in the first energy storage portion and the second energy storage portion of the supercapacitor 300 in a storage step 914. As energy is needed, for example to power an electronic device, the energy is discharged in a discharge step 924. Any or all of the generation step 911, the storage step 914, and the discharge step 924 may be controlled independently by a controller 928 having a processor 917 (which includes software 968) and a memory 959. For example, the amount of voltage generated in the generation step 911 can be regulated by the processor 917 (e.g., scaled back) if the amount of stored energy is at a maximum. Additionally, the amount of energy discharged to a device may be limited if the stored energy is below a certain minimum and there is no generation, in order to avoid complete depletion of the stored energy. The controller 928, processor 917, memory 959, and software 968 may correspond to the controller 320, processor 322, memory 324, and software 326, as indicated in FIG. 3A.

In any of the exemplary embodiments of the hybrid power device (the supercapacitor 300, etc.), the device may be thinner compared to conventional power device structures (e.g., as shown in FIGS. 1 and 2). Normally, in thin film batteries and supercapacitors, multiple anode, cathode, and separator layers may be stacked together to increase the capacity in limited space. For the structure as shown in FIG. 2, this may have to be done separately, which makes the manufacturing complicated and may increase the thickness of the device. In fact, energy generation and energy storage may be normally completed in two separate units, which may increase the cost and size of any power system.

In the exemplary embodiments disclosed herein, however, it may be possible to realize the stacking of energy harvesting and energy storage parts together, which may increase the storage capacity per unit volume. Furthermore, with regard to the hybrid power devices disclosed herein, the piezoelectric film itself may not be conductive, so additional metallization or supplemental electrical wiring may be used to connect the piezoelectric film to the battery. If employed, such features may generally result in extra manufacturing steps and may also increase the thickness of the entire structure. To obtain as thin a device as possible, it may be desirable to increase flexibility to enable use of the device in a wide variety of applications.

In any of the foregoing exemplary embodiments, numerous advantages are realized. First, a naturally flexible form of energy storage may be exploited to harvest energy. In particular, energy generated by the mechanical deformation such as flexing, knocking, and/or pressing may be directly stored in the electrochemical cell. Second, energy conversion efficiency may be increased, and the weight and size of a battery when compared to separate energy generating and storage system may be reduced. Third, conventional battery and supercapacitor electrode and separator materials may be applicable in this design, which may make the fabrication simple and lowers costs. Also, conventional battery and supercapacitor manufacturing methods may be used if desired.

By combining the energy generating and energy storage functions in one unit, the hybrid power device described in the exemplary embodiments herein may both be more efficient and may benefit from reduction of weight, overall volume, and thickness as compared to a system comprising separate units laminated together. Such a system combines the energy storage and energy harvesting by exploiting any mechanical deformation of the system such as bending, vibration, knocking, etc.

The exemplary embodiments as disclosed herein have broad applications over various ranges and scales and may be incorporated into numerous types of devices to contribute to energy autonomy. For example, flexibility of the energy storage system may be exploited to convert mechanical deformation into energy for further charging of electronic devices. Furthermore, the energy generated from vibrational motion may be useful for small, low-power systems such as sensors/actuators and micro-electromechanical systems as well as for biomedical applications or remote sensing or similar applications in which battery recharging may be difficult. Applications with which the energy storage systems as disclosed herein can be used also include, but are not limited to, clothing, clothes, paper products (e.g., functional newspapers), portable devices (e.g., soft portable electronic gadgets), toys, and the like. Other possible applications include use as thin and flexible energy autonomous sensors in the form of plasters attached to the skin, such sensors being capable of monitoring body conditions such as temperature, blood pressure, heart rate, and the like for subsequent wireless communication to a mobile device when the charge pump accumulates a sufficient amount of energy (e.g., whenever the user moves and deforms their skin). The present invention is not so limited, however, as other applications in which mechanical deformation provides a piezoelectric effect and in which energy may be stored and subsequently recovered are possible.

In one exemplary embodiment, an apparatus comprises a separator/electrolyte assembly; a first energy storage portion disposed on a first surface of the separator/electrolyte assembly; a second energy storage portion disposed on a second surface of the separator/electrolyte assembly; a first metallized PVDF film disposed on the first energy storage portion; and a second metallized PVDF film disposed on the second energy storage portion. A diode may be connected between the first and second outer electrodes on the first and second piezoelectric films to enable the pumping of charge in a single direction under multiple deformation/release cycles. When a force is applied to the first metallized film, a piezoelectric field is generated to cause charge separation at an interface of the separator/electrolyte assembly and each energy storage portion to generate energy.

In the apparatus, the separator/electrolyte assembly may comprise a polymer structure having a liquid electrolyte infused therein. The polymer structure may comprise polypropylene and the liquid electrolyte may comprise a tetrafluoroborate salt. The liquid electrolyte may comprise tetraethylammonium tetrafluoroborate. At least one of the first energy storage portion and the second energy storage portion may comprise activated carbon. The first energy storage portion may comprise a first activated carbon layer and the second energy storage portion may comprise a second activated carbon layer. The first metallized film and the second metallized film may each comprise a layer of PVDF on which aluminum is deposited on opposing sides thereof. The first energy storage portion may comprise a lithium metal oxide film and the second energy storage portion may comprise a graphite layer. The first metallized film may comprise a layer of PVDF on which aluminum is deposited on opposing sides thereof and the second metallized film may comprise a layer of PVDF on which copper is deposited on opposing sides thereof. The apparatus may further comprise a controller, a processor, and a memory coupled to at least one of the separator/electrolyte assembly, the first energy storage portion, the second energy storage portion, the first metallized film, and the second metallized film. The apparatus may comprise an electronic device, and the electronic device may be any of a hand-held mobile device, a wearable device, a phone, camera, tablet, video/audio device, navigation device, gaming device, messaging device, web-browser, or a combination of the foregoing.

In another exemplary embodiment, a method comprises generating a voltage in an apparatus, the apparatus comprising a separator/electrolyte assembly, a first energy storage portion disposed on a first surface of the separator/electrolyte assembly, a second energy storage portion disposed on a second surface of the separator/electrolyte assembly, a first metallized film disposed on the first energy storage portion, and a second metallized film disposed on the second energy storage portion, wherein when a force is applied to the first metallized film, a piezoelectric field is generated to cause charge separation at an interface of the separator and each energy storage portion to generate energy; storing the energy generated in the first energy storage portion and the second energy storage portion; and discharging the stored energy from the first energy portion and the second energy storage portion to an electronic device.

The method may further comprise controlling the discharging of the stored energy via a controller having at least a processor and a memory. The amount of voltage generated may be regulated by the processor. The amount of energy discharged may be limited if the stored energy is less than a certain amount.

In another exemplary aspect, an apparatus for operating a hybrid power device comprises means for generating a voltage in the hybrid power device; means for storing the energy generated in the hybrid power device; and means for discharging the stored energy from the means for storing the energy to an electronic device. The means for operating a hybrid power device may comprise means for controlling the discharging of the stored and energy.

In another exemplary aspect, a non-transitory computer readable storage medium, comprising one or more sequences of one or more instructions which, when executed by one or more processors of an apparatus, causes the apparatus to at least: generate a voltage in an apparatus, store the energy generated in the apparatus; and discharge the stored energy from the apparatus to an electronic device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. An apparatus comprising:
a separator/electrolyte assembly;
a first energy storage portion disposed on a first surface of the separator/electrolyte assembly;
a second energy storage portion disposed on a second surface of the separator/electrolyte assembly;
a first metallized piezoelectric film disposed on the first energy storage portion; and
a second metallized piezoelectric film disposed on the second energy storage portion;
wherein when a force is applied to the first metallized piezoelectric film, a piezoelectric effect converts mechanical strain into electric potential and each energy storage portion stores the energy converted in the first energy storage portion and the second energy storage portion for subsequent discharge from the first energy portion and the second energy storage portion to an electronic device.

2. The apparatus of claim 1, further comprising a diode connected between the first metallized piezoelectric film and the second metallized piezoelectric film.

3. The apparatus of claim 1, wherein the diode is a film integral with the apparatus.

4. The apparatus of claim 1, wherein the diode is externally connected to the first metallized piezoelectric film and the second metallized piezoelectric film.

5. The apparatus of claim 1, wherein the separator/electrolyte assembly comprises a polymer structure having a liquid electrolyte infused therein.

6. The apparatus of claim 5, wherein the polymer structure comprises polypropylene and the liquid electrolyte comprises a tetrafluoroborate salt.

7. The apparatus of claim 5, wherein the liquid electrolyte comprises tetraethylammonium tetrafluoroborate.

8. The apparatus of claim 1, wherein at least one of the first energy storage portion and the second energy storage portion comprises activated carbon.

9. The apparatus of claim 1, wherein the first energy storage portion comprises a first activated carbon layer and the second energy storage portion comprises a second activated carbon layer.

10. The apparatus of claim 1, wherein the first metallized piezoelectric film and the second metallized piezoelectric film each comprise a layer of PVDF on which aluminum is deposited on opposing sides thereof.

11. The apparatus of claim 1, wherein the first energy storage portion comprises a lithium metal oxide film and the second energy storage portion comprises a graphite layer.

12. The apparatus of claim 11, wherein the first metallized piezoelectric film comprises a layer of PVDF on which aluminum is deposited on opposing sides thereof and the second metallized piezoelectric film comprises a layer of PVDF on which copper is deposited on opposing sides thereof.

13. An electronic device comprising the apparatus of claim 1.

14. The electronic device of claim 13, wherein the electronic device is any of a hand-held mobile device, a wearable device, a phone, camera, tablet, video/audio device, navigation device, gaming device, messaging device, web-browser, or a combination of the foregoing.

15. The apparatus of claim 1, further comprising a controller, a processor, and a memory coupled to at least one of the separator/electrolyte assembly, the first energy storage portion, the second energy storage portion, the first metallized piezoelectric film, and the second metallized piezoelectric film.

16. A method, comprising: generating a voltage in an apparatus, the apparatus comprising a separator/electrolyte assembly, a first energy storage portion disposed on a first surface of the separator/electrolyte assembly, a second energy storage portion disposed on a second surface of the separator/electrolyte assembly, a first metallized piezoelectric, film disposed on the first energy storage portion, and a second metallized piezoelectric film disposed on the second energy storage portion, wherein when a force is applied to the first metallized piezoelectric film, a piezoelectric effect converts mechanical strain into electric potential and each energy storage portion stores the energy converted in the first energy storage portion and the second energy storage portion and discharges the stored energy from the first energy portion and the second energy storage portion to an electronic device.

17. The method of claim 16, further comprising the pumping of charge through a diode in a single direction under multiple deformation/release cycles.

18. The method of claim 16, wherein the amount of energy discharged is limited if the stored energy is less than a certain amount.

19. The method of claim 16, further comprising controlling the discharging of the stored energy via a controller having at least a processor and a memory.

* * * * *